(12) United States Patent
Heckel et al.

(10) Patent No.: US 11,604,446 B2
(45) Date of Patent: Mar. 14, 2023

(54) METHOD AND SYSTEM FOR VALIDATING A CONTROL PROGRAM

(71) Applicant: Siemens Aktiengesellschaft, Munich (DE)

(72) Inventors: Udo Heckel, Wendelstein (DE); Gautier Jehl, Nuremberg (DE); Vitus Hawkridge, Giegen an der Brenz (DE); Marcelo Jorge Favaro, Nuremberg (DE); Thibault De Assi, Nuremberg (DE); Edison De Faria Siqueira, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/786,480

(22) Filed: Feb. 10, 2020

(65) Prior Publication Data
US 2020/0257259 A1    Aug. 13, 2020

(30) Foreign Application Priority Data
Feb. 11, 2019  (EP) .................................. 19156415

(51) Int. Cl.
*G05B 19/042*  (2006.01)
*G05B 19/05*   (2006.01)
*G05B 19/418*  (2006.01)

(52) U.S. Cl.
CPC ..... *G05B 19/0426* (2013.01); *G05B 19/0423* (2013.01); *G05B 19/056* (2013.01); *G05B 19/41885* (2013.01)

(58) Field of Classification Search
CPC ................ G05B 17/02; G05B 19/0426; G05B 19/41885; G05B 19/0423; G05B 19/056;
(Continued)

(56) References Cited

U.S. PATENT DOCUMENTS

| 6,341,291 B1 | 1/2002 | Bentley et al. |
| 10,755,003 B2 | 8/2020 | Maturana et al. |

(Continued)

FOREIGN PATENT DOCUMENTS

| CN | 104678778 | 6/2015 |
| EP | 2790101 | 10/2014 |

(Continued)

*Primary Examiner* — Charles E Anya
(74) *Attorney, Agent, or Firm* — Cozen O'Connor

(57) ABSTRACT

Method and system for validating a control program for an automation system, wherein the control program is created in a first controller programming language and is arranged and setup to control an apparatus or device of the automation system when executed by an automation controller of the automation system, where the system includes a controller environment for executing the control program, an equipment simulation environment for executing a simulation program for simulating behavior of the apparatus or device or parts thereof, whereas the equipment simulation environment is communicatively coupled to the controller environment to enable and/or perform a simulation of the automation system, and whereas the simulation program is created in the first controller programming language or a second controller programming language.

41 Claims, 7 Drawing Sheets

(58) Field of Classification Search
CPC ........... G05B 2219/23446; G05B 2219/34454; G05B 2219/23451
See application file for complete search history.

(56) References Cited

U.S. PATENT DOCUMENTS

| | | | |
|---|---|---|---|
| 2002/0029218 A1* | 3/2002 | Bentley | G06F 16/1734 |
| 2003/0033133 A1* | 2/2003 | Kleyer | G09B 25/02 |
| | | | 703/22 |
| 2008/0126973 A1* | 5/2008 | Kline | G05B 19/056 |
| | | | 715/772 |
| 2009/0089234 A1* | 4/2009 | Sturrock | G05B 17/02 |
| | | | 706/45 |
| 2012/0197617 A1* | 8/2012 | Mujagic | G06F 30/331 |
| | | | 703/7 |
| 2014/0297244 A1* | 10/2014 | Maturana | G06G 7/66 |
| | | | 703/7 |
| 2015/0019191 A1 | 1/2015 | Maturana et al. | |
| 2015/0134317 A1* | 5/2015 | Maturana | G06F 30/20 |
| | | | 703/13 |
| 2015/0378333 A1* | 12/2015 | Fujii | H02P 23/0031 |
| | | | 700/29 |
| 2016/0224003 A1* | 8/2016 | Buschmann | G06Q 50/04 |
| 2016/0292004 A1* | 10/2016 | Sawada | G06F 9/3885 |
| 2018/0157735 A1* | 6/2018 | Noetzelmann | G06Q 10/06 |

FOREIGN PATENT DOCUMENTS

| | | |
|---|---|---|
| EP | 2871544 | 5/2015 |
| EP | 2924562 | 9/2015 |
| EP | 2985663 | 2/2016 |

\* cited by examiner

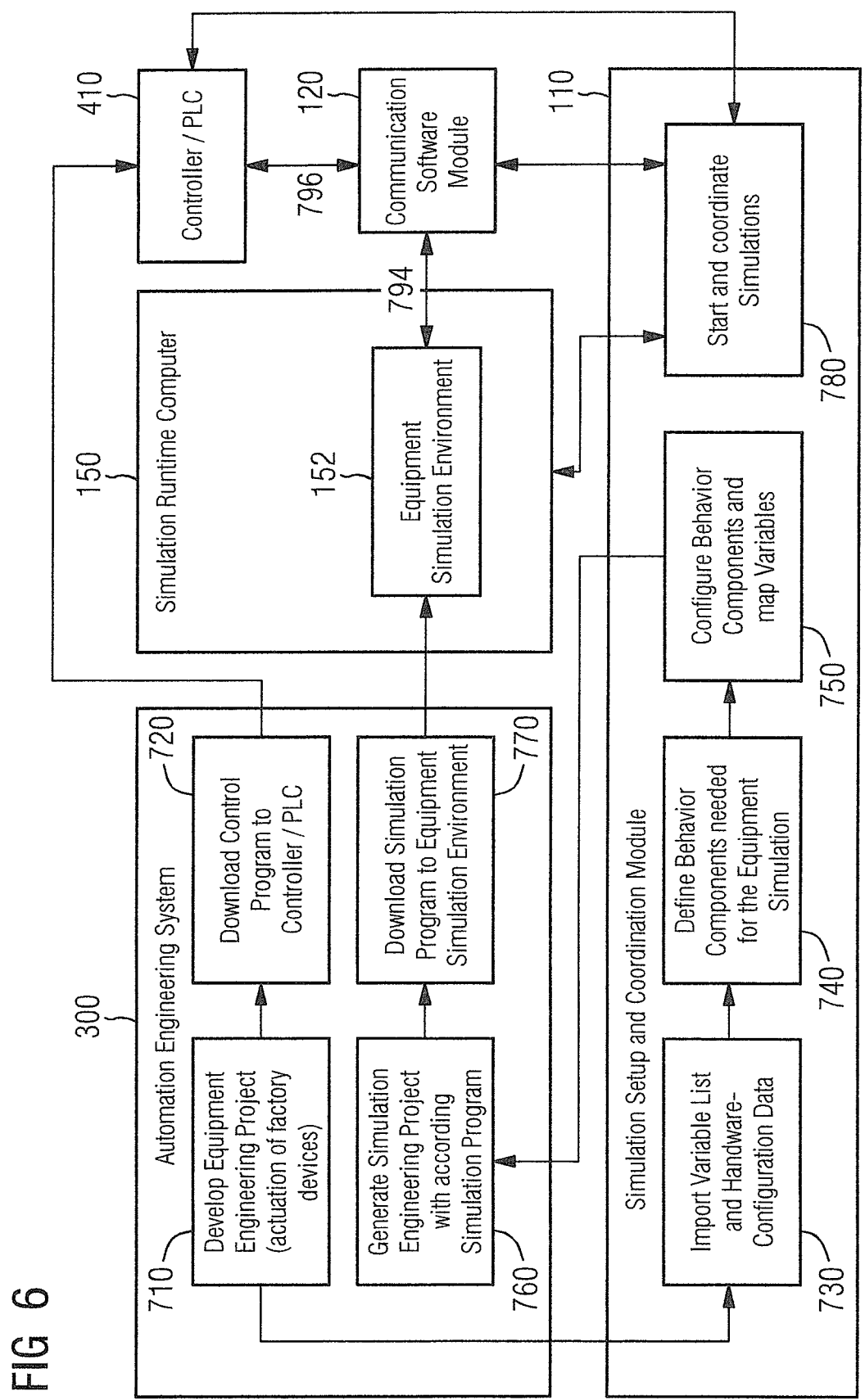

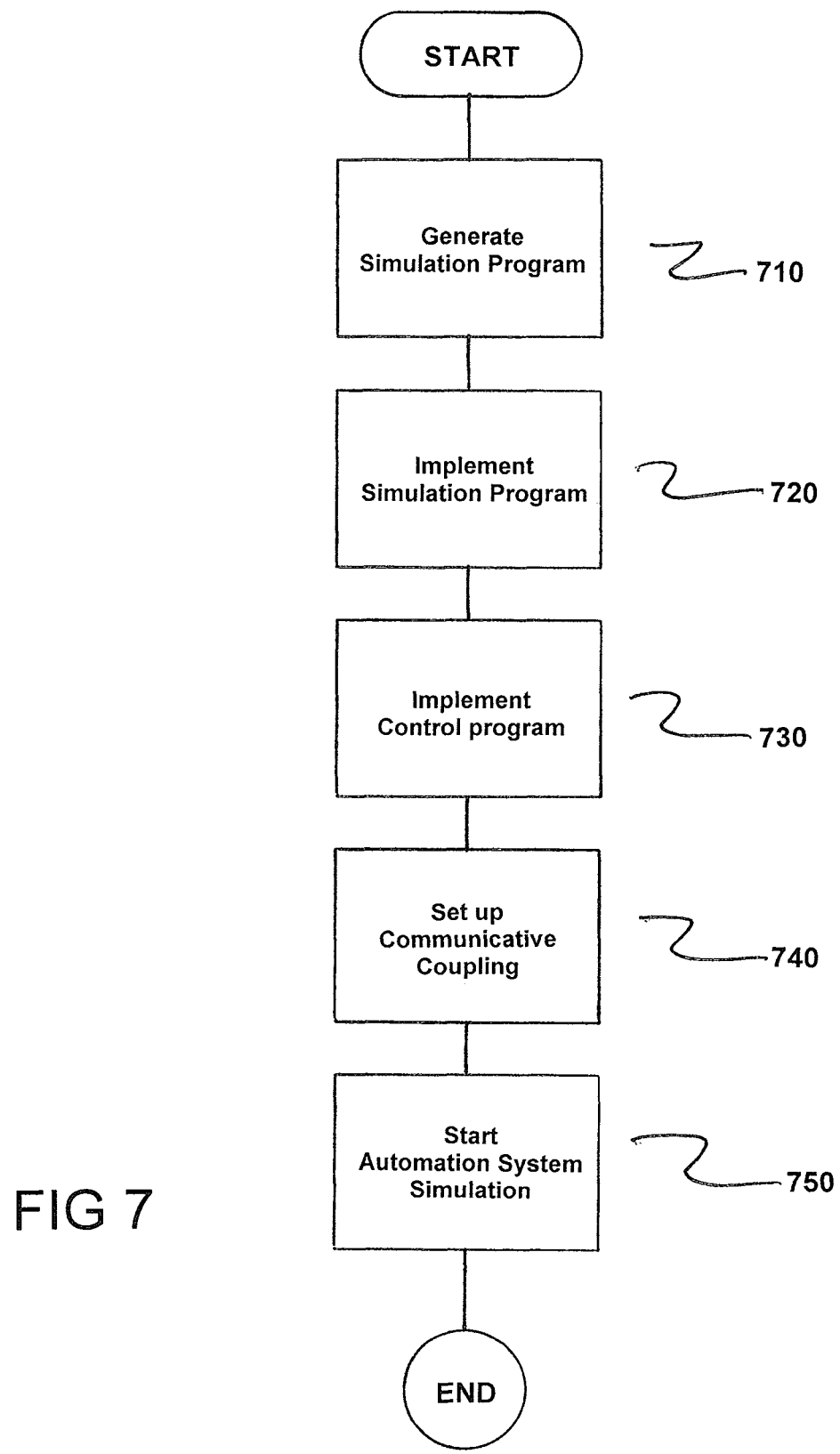

METHOD AND SYSTEM FOR VALIDATING A CONTROL PROGRAM

BACKGROUND OF THE INVENTION

1. Field of the Invention

The present invention relates to a method and system for validating a control program for an automation system, where the control program is created in a first controller programming language and is further arranged and set up to control an apparatus or device of the automation system when executed by an automation controller of the automation system, where the system for validating the control program comprises a controller environment for executing the control program and an equipment simulation environment for executing a simulation program for simulation of the behavior of the apparatus or device or parts thereof, and where the equipment simulation environment is communicatively coupled to the control environment to enable simulation of the automation system or to simulate the automation system.

2. Description of the Related Art

European patent EP 2790101B1 shows, for example, a system and method for automated virtual commissioning of an industrial automation system.

The industrial automation system to be commissioned comprises a distributed control system for controlling an industrial plant during a production process. The system for automated virtual commissioning comprises virtual appliance templates corresponding to the automation system servers and are connected to an engineering client. The system further comprises virtual machine templates for the different elements of the distributed control emulating the respective type of the control system element. After retrieving engineering data from the engineering client, those virtual machine templates are correspondingly instantiated. After setting up this system, it can be used for automated commissioning of the industrial automation system.

It is a disadvantage of the known systems, that it is relatively difficult and complex to set up such simulation systems involving various simulation tools and elements.

SUMMARY OF THE INVENTION

In view of the foregoing, it is therefore an object of the invention to provide a system for validating a control program that enables a simpler setup of the system.

This and other objects and advantages are achieved in accordance with the invention by a system for validating a control program for an automation system. The automation system comprises an automation controller for executing the control program and an apparatus or device, where the control program is created in the first controller programming language and is configured to control the apparatus or device, when executed by the automation controller.

The system for validation of the control program comprises: a controller environment for executing the control program, an equipment simulation environment for execution of a simulation program to simulate the behavior of the apparatus or device or parts thereof, where the equipment simulation environment is communicatively coupled to the controller environment to enable and/or perform a simulation of the automation system, and where the simulation program is created in the first controller programming language or a second controller programming language.

The simulation program and the control program are both written in a controller programming language. Consequently, it is much easier to coordinate the execution of the control program with the execution of the simulation program, because comparable tools can be used for both parts.

It is also possible, for example, for the control program be written using a tool for creating control programs, such as an automation engineering system. Such systems are typically made and used for setting up automation systems, typically including controllers and devices controlled by those controllers. Those automation engineering system typically also include tools to create control programs for the controllers to control the devices. The control program could, for example, be created in such an engineering system and the simulation also could be created in such an engineering system.

In an advantageous embodiment, the control program and the simulation program could be created within the same automation engineering system.

For the communicative coupling of the equipment simulation environment to the controller environment for simulating the automation system, it is necessary to coordinate the output data of the controller environment to the input data of the equipment simulation environment and the input data of the controller environment to the output data of the equipment simulation environment.

If the control program, as well as the simulation program are both created within an automation engineering system, such coordination of in- and output data is easier than known from prior art. And it can be even easier, if both programs are created within the same or similar automation engineering systems due to comparable data structures, programming tools and interfaces. This eases the identification of respective input and output data for the simulation and control program, which must be coupled to get a proper coordination of the equipment simulation environment to the controller environment for simulation of the automation system. This is one reason why the system for validation of a control program disclosed herein enables the simpler setup of such validation system.

The controller can be, for example, a programmable logic controller (PLC) or a modular programmable logic controller. The controller can also be any kind of computer or computer system built and setup to control an apparatus or device. The controller can also be a controller software application (e.g., a soft controller or controller app) set up to be executed by a computer, a computer system or a cloud.

The apparatus or device could, for example, be or comprise a sensor, an electromechanical or mechanical actor like a motor or inverter, a mechanical or electromechanical module, a machine, a component, a plant and/or parts thereof.

The execution of the control program can be established in a way, that the program code of the control program is directly executed within, for example, the automation controller. The execution of the control program could be also be established in a way that a compiled version of the program code is then executed within, for example, the automation controller and/or the controller environment.

A controller programming language, for example, the first and/or second controller programming language can be any programming language specifically provided for programming controllers or programmable logic controllers (PLC).

Such controller programming language can, for example, be a programming language according to the International Electro Technical Commission (IEC) standard 61131-3 and/or according to IEC standard 61499.

As defined in IEC standard 61131-3, standard programming languages for PLC are: Structured Text (ST) (also known, e.g., as Structured Text Language (STL) or Structured Control Language (SCL), Ladder Diagram (LAD), Instruction List (IL), Sequential Function Chart (SFC) (also known, e.g., as "S7 GRAPH") and Function Block Diagram (FBD) (also known, e.g., as FUP ("Funktionsplan")). As an extension of the programming languages defined by IEC standard 61131-3, IEC standard 61499 defines algorithm encapsulation, subprograms and system applications as standard controller programming language.

The controller programming language, for example, the first and/or second controller programming language, can be established to contain, comprise or consist of "function blocks". A function block can be defined as a subprogram with parameters and local data and can be, e.g., a function block according to the IEC standard 61131-3.

A function block can also be a function block according to IEC standard 61499. Such function blocks can, e.g., be assigned and set up in a way, that a function block used in an algorithm can be written in several languages, for example, the language is included in the IEC standard 61131 and also in high-level languages as well (e.g., C or Java).

The controller programming language used for creating the simulation program can be, for example, the first controller programming language, which is also used for creating the control program. The controller programming language used for creating the simulation program can also be a second controller programming language, being different from the programming language used to create the control program. The second controller programming language can also be arranged and setup as a controller programming language in accordance with the present invention.

Such use of the second controller programming language for creating the simulation program can be advantageous, because it can enable the use of a controller programming language being especially adapted to the working principle of the simulated device, component, machine and/or plant or the special one or more simulated aspects of such devices.

The controller environment can, for example, be configured as a controller hardware, such as a programmable logic controller (PLC) or a controller as disclosed in this description. The controller environment can also be established as a controller simulation system or a platform for simulating a controller hardware. Such a controller simulation system can, for example, be run or set up on any kind of computer, computer system, computer network or in the cloud.

The controller environment can be configured, for example, to execute the control program code as such or to execute a compiled version of the control program code. Such a compiled version of the control program code can, for example, be created by an according compiler or by an according automation engineering system in which the control program code has been created or stored. Such a compiled version of the control program can also be created directly before executing the code within the controller environment. Both embodiments, executing the code as such or executing a compiled version of the code, are understood to be an execution of the control program in accordance with the present invention.

The equipment simulation environment can be any software or hardware environment enabled, arranged and/or configured to execute the simulation program. It can be, for example, a software simulation system or a software simulation environment for executing simulation programs.

The simulation program can be, for example, arranged and configured to simulate an electrical, mechanical, pneumatic, physical, and/or any other kind of behavior of a device, machine, engine, component, plant and/or similar kind of devices or machines.

The equipment simulation environment can be configured, for example, to execute the simulation program code as such or to execute a compiled version of the simulation program code. Such a compiled version of the simulation program code can, for example, be created by an appropriate compiler or by an appropriate automation engineering system in which the simulation program code has been created or stored. Such compiled version of the simulation program can also be created directly before executing the code within the equipment simulation environment. Both embodiments, executing the code as such or executing a compiled version of the code, are understood to be an execution of the simulation program in accordance with the present inventions.

The simulation of the automation system is performed such that the control program is executed by the controller environment and the simulation program is executed by the equipment simulation environment, whereas the controller environment and equipment simulation environment are exchanging data such that the automation system, or at least an aspect of the automation system, is simulated.

Such an aspect of the automation system can be, for example, an electrical, mechanical, pneumatic, physical and/or comparable behavior of the apparatus or device or parts thereof.

The simulation of the automation system can, for example, be established such that, during execution of the control program by the controller environment controller, input data is used and control output data is generated. In parallel, during the execution of the simulation program by the equipment simulation environment, then such controller output data is used and controller input data is generated.

The communicative coupling of the control environment and the equipment simulation environment can be established up in to enable and/or perform the exchange of in- and/or output data used and/or generated by the control program with output and/or input data generated and/or used by the simulation program.

Such communication can be established such that it enables the simulation of the automation system in accordance with the present invention.

The communicative coupling of the equipment simulation environment and the control environment can be further configured to transfer the controller inputs data and the controller output data between the control environment and the equipment simulation environment during the simulation of the automation system in accordance with the present invention.

The communicative coupling of the equipment simulation environment and the controller environment can also include the assignment of controller input data and control output data to respective output and input data of the simulation program or parts thereof. Such an assignment of data of both programs can be performed manually or automatic or in a semi-automatic way.

Such data assignments can, for example, be realized in the way, that output data of the control program is assigned to appropriate input data for the simulation program to achieve a correct simulation of the automation system or an aspect of the automation system. For example, the controller output data can comprise one or more variables describing physical values for controlling the apparatus or device. Such variables can then be assigned to input variables of the simulation program such that the physical meaning of the respective variables is the same or corresponds to each other.

Such a way of assigning variables can also be performed to assign output data of the simulation program to input data of the control program.

In a preferred embodiment of the communicative coupling, the controller environment is configured to output data in the form of fieldbus telegrams. Such fieldbus telegrams can be configured in accordance with typical fieldbus-standards used in automation networks, such as ProfiNet, Profibus, EtherCat, Ethernet-IP or comparable fieldbus standards. The input of data into the controller environment can also be performed in the form of fieldbus telegrams in accordance with the present invention. In the same way, the input and/or output of data into and out of the equipment simulation environment can also be performed in the form of such fieldbus telegrams in accordance with the present invention.

This embodiment has the advantage that, for example, components of a control program being designed for getting and sending fieldbus telegrams, such as function blocks, can directly be used within the validation system in accordance with the presently disclosed embodiments. In the same way, appropriate simulation components also being designed for receiving and/or sending fieldbus telegrams, can be more easily used within the equipment simulation environment.

By way of this embodiment, it is also possible to not only simulate and/or test the control program working together with the apparatus or device but also a possible fieldbus communication between the automation controller and the apparatus or device.

In a further preferred embodiment, the controller environment is configured to cyclically process the control program. The controller environment can be further configured such that an exchange of data between the equipment simulation environment and the controller environment is performed once per program cycle. The controller environment can be configured in a way, that such data exchange is, for example, performed after the execution of a first cycle of the control program and before the execution of a proceeding next cycle of the control program. Data exchange can also be performed during the execution of a cycle of the control program.

The exchange of data between the controller environment and equipment simulation environment can further be configured in accordance with the presently disclosed embodiments.

In another preferred embodiment, the controller environment is configured to cyclically process the control program and to output a cycle end time value at the end of a program cycle of the control program. Such an embodiment of the invention enables an easier and/or more flexible coordination between the controller simulation and the equipment simulation environment.

The cycle and time value can be a time value according to a value of a clock corresponding to the moment in time, when a specific cycle of the execution of the control program ended. Such a cycle end time value can also comprise information enabling the calculation of such an end time value.

Such a cycle end time value can, for example, be part of controller output data or can be communicated in a separate way.

The time for the execution of one cycle of the control program can, for example, be characterized by a cycle time value, where after processing a first cycle of the control program, a first cycle end time value is output. Further, after the execution of a subsequent execution of the control program a second cycle end time value is output, where the second cycle end time value is based on the first cycle end time value and the cycle time value.

Using such cycle times for calculating the end times of subsequent program cycles eases the calculation of respective cycle end times. It also enables the use of predetermined cycle times during execution of the control program, such as to simulate special situations, controllers or use cases.

The cycle time value can be established to be the time used for the execution of a single program cycles. It can be established to be the time, for example, between two corresponding time values in subsequent program cycles. Therefore, the cycle time can be, for example, the time between the start of a first program cycle and the start of a subsequent program cycle.

In a further embodiment, the controller environment is configured to determine the cycle time value using a clock.

Such a clock can, for example, be an internal clock within the control environment or an external clock, coupled to the control environment. The clock can be established to deliver time values or/and to deliver counter values, such as the legal pulses, cycle numbers all comparable counter numbers.

The controller environment can be configured for example, to calculate the selected cycle time value after the execution of a predetermined program cycle and/or after each execution of a program cycle. A special cycle time value, determined for a predetermined or given program cycle, can be used as a basis for cycle times of following program cycles.

The cycle time value can also be established as a predetermined value. Such a predetermined value can, for example, be set and/or changed by a user.

Such a predetermined value can also be estimated by the controller environment by determining a time value for the time between two corresponding points in time between two subsequent program cycles during execution of the control program. Determining such a cycle time can be performed in accordance with the disclosed embodiments of the present invention.

Such a predetermined value can, for example, be a fixed predetermined value used for at least a number of subsequence program cycles. Such a fixed predetermined value can, for example, be set by the user or can be determined by using a clock in accordance with the disclosed embodiments of the present invention. Such a predetermined value can also be a value received from another, connected system. Such other systems could, for example, be an equipment simulation system, a simulation coordinating system or a comparable system for running, executing and/or coordinating simulations.

By using such predetermined values, special situations can be simulated. For example, the predetermined cycle time can correspond to a cycle time relevant for a special control environment, such as a special PLC model or a selected controller, used later on in a comparable use case. Further on, pre-determining the cycle time can be used to slow down or speed up the simulation of the automation system by using cycle time values that are larger or smaller than realistic cycle time values for the execution of a cycle of the control program in a real controller.

In a further preferred embodiment, the system for validation of the control program is communicatively coupled to an automation engineering system for receiving automation system engineering data from the automation engineering system, where the automation engineering system is configured to engineer the automation system by generating the automation system engineering data, and the automation system engineering data comprises the control program.

Connecting the system for validation of the control program to such an automation engineering system enables an easier access of the control program for the system for validation of the control program.

This setup also enables the system for validation of the control program to get access to further data related to the control program, such as a variable list about variables used by the control program and/or meta data related to such variables. It further enables the system for validating the control program to get access to further data regarding the automation system, especially regarding ID-information, parameters, settings and comparable data regarding different hardware components and communication setup of the automation system. This again enables a simpler setup of such a system for the validation of a control program.

In a preferred embodiment, the automation system engineering data is created for the automation system. Such engineering data can be generated in the automation engineering system and/or be stored in the automation engineering system. It can be part of an automation system engineering project comprising engineering data that is related to the automation system.

The automation engineering system can be a software environment, computer system, software application or comparable system for setting up an automation system. Such engineering systems can, for example, be configured to generate control programs for controllers forming part of the automation system, setting parameters for devices forming part of the automation system, setting up a communication between different parts of the automation system and comparable tasks that are necessary or advantageous for setting up an automation system.

Such an automation system engineering data can, for example, comprise the control program and eventually one or more further control programs. It also can comprise additional data related to the control program and/or one or more of the further control programs. Such additional data can be, for example, a variable list comprising variables used by a specific control program or meta data related to data and/or variables used by such control program.

Furthermore, the automation engineering system can be configured to create control programs in one or more controller programming languages in accordance with the presently disclosed embodiments of the invention.

The automation system engineering data can further comprise hardware configuration data comprising ID-information, parameters, settings and comparable data relating to hardware components forming part of the automation system. Such hardware components can be, for example, controllers, devices, actors, sensors, components, machines, robots, plans and parts of plants or comparable elements of the automation system.

The automation system engineering data can further comprise communication data regarding communication parameters for setting up and running a communication between different hardware components of the automation system. Such communication parameters can be ID-parameters regarding use communication protocols, settings for using such communication protocols, parameters for setting up master-slave communication connections or systems, parameters for setting up publish/subscribe communication connections or systems, parameters for setting up and/or performing real-time communication and/or comparable data and parameters for setting up a communication connection or system.

Automation system engineering data can also comprise HMI-data regarding setting up HMI-information for enabling the operation and monitoring the automation system by a user. Such HMI-information can, for example, comprise information regarding data that are to be output by an according HMI-device, such as a monitor, HMI-panel or any other device, which can display a graphical user interface. Further the HMI-information can comprise data regarding setting up such a graphical user interface (e.g., information regarding "faceplates") and information regarding in- and output data presented and generated by such a graphical user interface (e.g., ""tags").

The automation system engineering data can further comprise a variable list regarding input data used by the control program and/or output data generated by the control program, where the system for validation of the control program is further configured to define a communication of the controller input data and controller output data between the controller environment and the equipment simulation environment.

The usage of such a variable list can ease the setup of a system for validation of the control program in accordance with disclosed embodiment of the present invention, because it enables the access to additional data defining a coordination between the control environment and the equipment simulation environment. Such a variable list can contain additional information about the data used by the control program and the data generated by the control program.

The variable list can contain information about data used and produced by the control program being assigned to those variables. Such information about these variables can, for example, comprise variable names or variable-ID-information and/or meta data regarding variables. Such meta data can, for example, comprise information about physical units regarding such data, a description of such data, a physical meaning of such data, an apparatus or device, to which such data is related or comparable information.

The definition of the transfer of the controller input data and the controller output data between the controller environment and equipment simulation environment can comprise the step of assigning controller input data to output data, generated by the simulation program. This step can, for example, comprise the analysis of a variable list regarding the controller input data and the analysis of a comparable variable list regarding the output data generated by the simulation program.

The comparison of such lists can, for example, comprise the comparison of variable names and/or one or more elements of meta data or ID information regarding variables in those lists. Appropriate variables of the controller input data can be assigned to corresponding ones generated by the simulation program based on such an analysis. So, for example, the meta data regarding a speed value of a motor forming part of the apparatus or device can contain the information, that this value is about the speed of this motor with a given ID. Such information can also be contained in the meta data of a variable for which the value is generated by the simulation program. During the definition of the transfer of the data between the controller environment and the equipment simulation environment such variables can then be assigned to each other.

In a similar way controller output data can be assigned to corresponding data used by the simulation program.

Such definition of the transfer of the controller input data and control output data between the controller environment and equipment simulation environment can be performed in a manual manner, an automatic manner or a semi-automatic manner. Such an automatic manner can be performed such that a variable list regarding controller input and/or output data is compared to corresponding variable lists regarding data being output and/or used by the simulation program. By comparing one or more kinds of information contained in such a list, such as variable names, variable IDs and/or different kinds of meta data contained in such list, the respective variables are assigned to each other.

The semi-automatic assignment of the variables can be performed such that as many variables as possible are automatically assigned in accordance with the above disclosed embodiments and the remaining variables are manually assigned by a user as described below in more detail.

In a step following such automatic or semi-automatic assignment, this assignment can be further amended by a user.

The definition of the transfer of the data between the controller environment and the equipment simulation environment can also be performed manually by a user. To assist a user during the assignment of control program out- and input data to data used and produced by the simulation program, the system for validation the control program can be configured to output according variable lists in accordance with the presently disclosed embodiments to a user, for example, using a graphical user interface presented on a display device. The system for validation of the control program can then, e.g., be further configured to enable the user to directly graphically connect corresponding control program variables and simulation program variables using such graphical user interface.

In a preferred embodiment, the system for validation the control program further comprises an equipment simulation database for storing behavior components for the simulation of technical equipment and parts thereof and comprising at least one module behavior component corresponding to the simulation program.

The usage of such equipment simulation-based database enables using a collection of preprogrammed simulation software components, named behavior components herein, to simulate technical devices, actors, sensors, machines, components, plans and/or parts thereof. For example, in such a database, simulation components for different motors, sensors, converters or comparable devices could be stored.

By the usage of such an equipment simulation database, the setup of the system for validation of the control program can be made easier, because preprogrammed simulation behavior components can be selected from such equipment simulation database and subsequently used to generate the simulation program instead of having to program simulation software for each and every part of the apparatus or device when setting up the system for validation of the control program.

Behavior components can be formed as computer programs for simulation of a predetermined technical element, such as a sensor, actor, device, component, machine or element thereof. Such a computer program can be created preferably in a controller programming language but also a different programming language.

The system for validation of the control program can be configured to create the simulation program based on the at least one module behavior component.

The simulation database can be any kind of database, for example, an SQL-database or a non-SQL-database. The equipment simulation database can, for example, be located within an simulation setup and coordination module in accordance with disclosed embodiments, within an automation engineering system in accordance with disclosed embodiments, within a simulation runtime computer in accordance with disclosed embodiments and/or as separate data-processing unit or computer.

In the case, in which for all parts of the apparatus or device, necessary for simulating the automation system, a behavior component is stored in the equipment simulation-based database, the system for validation of the control program can be configured to create the simulation program on the basis of those behavior components, named module behavior components herein.

In the case, that the equipment simulation database does not contain behavior components for all parts of the apparatus or device necessary for simulating the automation system, additional behavior components or simulation programs can be generated, or they can be imported from other systems, such as other simulation databases or comparable systems.

The simulation program can be based on a single behavior component or can comprise more than one behavior component. The system for validation of the control program comprising the equipment simulation database can be configured such that the simulation program can solely be based upon the at least one module behavior component or the at least one module behavior component contains all information necessary to generate the simulation program.

The system for validation of the control program can be configured to generate the simulation program based on the at least one module behavior component. This step of generating the simulation program can comprise the transformation of program code between different programming languages. In the case of more than one behavior components being used, the generation of the simulation program additionally can comprise the step of assigning variables between different behavior components and/or setting up a communication between different behavior components.

In a preferred embodiment of the behavior components, the behavior components are based on the first controller programming language, the second controller programming language and/or further one or more controller programming languages. This embodiment has the advantage, that it further simplifies the setting up of the system for validation of the control program, because it enables a simplified setup of the simulation program. In a further preferred embodiment, the at least one module behavior components are already created in the controller programming language used for the simulation program. Here, no transformation of program code between different programming languages is necessary to create the simulation program.

In a preferred embodiment, the system for validation of the control program is further configured to select the at least module behavior component from the equipment simulation database. This embodiment further simplifies the setup of the system for validation of the control program, because the at least one module behavior component, being stored in the equipment simulation database, can be automatically selected by the system.

The selection can be based, for example, on additional information contained in the system for validation of the control program about the apparatus or device. For example, information about the components or elements of the apparatus or device, necessary for simulating the automation system, can be stored in the system for validation of the control program. This information can then be used for selecting the at least one module behavior component from the equipment simulation database.

Such information can be, for example, ID-information regarding such apparatus or device or elements thereof, where such ID information allows the system for validation of the control program to subsequently select the appropriate behavior components from the equipment simulation database.

The automation system engineering data in accordance with the disclosed embodiments can further comprise ID-information regarding the apparatus or device or parts thereof, where the system for validation of the control program is further arranged and set up for importing such ID-information and for selecting the at least one module behavior component from the equipment simulation database based on this ID-information. This embodiment further simplifies the setup of the system for validation of the control program, because relevant data for the selection of the at least one module behavior component from the equipment simulation database can be imported from the automation engineering system.

The automation engineering system can, for example, comprise an automation system engineering project comprising the automation system engineering data with the control program and the ID-information regarding the apparatus or device or parts thereof. This enables the system for validation of the control program to also select the at least one module behavior component from the equipment simulation database based on information imported from the automation engineering system.

The selection of the at least one module behavior component can be based on an analysis of the ID-information imported from the automation engineering system. This analyzed ID-information can be, for example, compared to information stored in the equipment simulation database about the behavior components stored therein. Based on that comparison, the selection of the at least one module behavior component from the equipment simulation database can be performed by the system to validate the control program.

In a preferred embodiment, the system for validating the control program is further configured to set up the simulation program based on the at least one module behavior component.

Such a setup of the simulation program based on the at least one module behavior component can be configured in accordance with disclosed embodiments of the present invention.

In another preferred embodiment, the system for validating the control program is further configured generate a simulation engineering project within the automation engineering system or a further automation engineering system, where the simulation engineering project comprises the simulation program.

This embodiment further simplifies the setup of a system for validating the control program, because creation of the control program and the simulation program is performed either in the same automation engineering system or in different automation engineering systems (preferably similar automation engineering system). Therefore, a user does not need to deal with totally different systems to create the control program and to create the simulation program.

Using an automation engineering system for setting up the simulation engineering project comprising the simulation program enables, e.g., a relatively easy access to editing tools for editing software written in controller programming languages. Therefore, a user creating a simulation for an automation system in this case has only to deal with one type of software environment for creating both the control program and the simulation program.

Having only one software system type for creating and/or editing the automation program and the simulation program can also ease the setup of a communicative coupling of the equipment simulation environment to the controller environment because, for example, variable lists related to the simulation program and the controller program can have similar formats or can be presentable to a user within the same software environment or similar software environments. This makes it easier to compare the data and assign the data of the control program to the related data of the simulation program.

The system for validating the control program can further comprise a simulation coordination module arranged and set up for performing at least one of the following tasks: coordinate the controller system and the equipment simulation system to simulate automation system, initiate a transfer of the control program from the automation engineering system to the controller environment, receive the ID-Data from the automation engineering system and select the at least one module behavior component from the equipment simulation database, receive the variable list from the automation engineering system and to establish the communicative coupling between the controller environment and the equipment simulation environment, and/or generate the simulation engineering project within the automation engineering system or a further instance of the automation engineering system, the simulation engineering project comprising the simulation program.

The usage of such a simulation coordination module enables an easier and simpler setup of the system to validate the control program because one or more of the steps necessary to set up such system can be performed in a coordinated manner by a single module. In a preferred embodiment, more than one, or even all of the steps named, can be performed within or by the simulation coordination module.

The control system, the equipment simulation system, the control program, the automation engineering system, the ID-data, the at least one module behavior component, the equipment simulation database, the variable list, the communicative coupling, the equipment simulation environment, the simulation engineering project, the automation engineering system and/or the simulation program can be configured in accordance with disclosed embodiments of the present invention.

The system for validation the control program can further comprise a communication software module that is communicatively coupled to the controller environment and the equipment simulation environment.

Such a communication software module enables an easier communication between the controller environment and the equipment simulation environment because it enables, for example, the handover of data generated and/or used by the control program and data generated and/or used by the simulation program. This embodiment makes it easier to, for example, establish the controller environment and equipment simulation environment more independently, because such a hand over of data between both environments has, e.g., not to be taken care of by one of those environments or both environments.

Both environments could also, for example, be connected to such communication software module without even knowing about the other environments data.

The communicative coupling of the equipment simulation environment and the control environment can in this case, e.g., be performed only via the communication software module. If the system is set up in that way, then the handling of the controller simulation, of the device simulation and the office communication between both simulations are separated in different modules which makes the setup and handling of the system for validation of the control program easier.

In a preferred embodiment, the automation system further comprises additional technical equipment and the system for validating the control program further comprises a further simulation environment for simulation of the additional technical equipment, where the control program is established to also control the technical equipment when executed by the automation controller, and where the further simulation environment is communicatively coupled to the controller environment to enable a simulation of the automation system or to simulate the automation system.

The system for the validation of the control program, the control program itself, the communicative coupling and/or the control environment can be configured in accordance with disclosed embodiments of the invention.

This embodiment allows a system for validating the control program combining an equipment simulation consisting of two (or more) sub-systems. One of those sub-systems enables a simulation with in an equipment simulation environment in accordance with disclosed embodiments, where a further part of the apparatus or device is simulated within the further simulation environment. Such a combination has the advantage, that it enables the combination of different simulations performed in different simulation environments, for example, simulate different aspects of the apparatus or device. Such different aspects can, for example, be an electric, mechanical, thermodynamic or comparable simulation of the apparatus or device.

The communicative coupling between control environment and further simulation system can be established in a similar manner as the setup of the communicative coupling of the control environment to the equipment simulation system.

In case the system for validating the control program comprises a communication software module in accordance with disclosed embodiments, the further simulation environment can also be communicatively coupled to this communication software module for handling the data transfer between the further simulation environment and the controller environment.

The simulation coordination module can further be configured to coordinate the controller environment the equipment simulation environment and the further simulation environment.

In this setup of the simulation coordination module, the synchronization between the simulation environments involved in the simulation of the automation system is handled by this coordination module. This makes the handling and setup of the system for validation of the control program simpler because not one of the environments has to care about communication with other environments. This makes it easier, for example, to set up the system and also subsequently to change the system by, for example, adding another simulation environment or removing a simulation environment from the system. When doing that, a user needs not to care about changing the related communication because this is handled by the simulation coordination module.

In a preferred embodiment, the controller environment comprises the automation controller. Such an embodiment of the invention is, e.g., a hardware-in-the-loop setup. In such a setup, the control environment comprises or consists of the automation controller of the automation system, where the apparatus or device of the automation system is simulated in the equipment simulation environment.

In such a system, the control program is executed by the automation controller and can be tested without setting up the full apparatus or device of the automation system.

In another preferred embodiment, the controller environment is arranged and set up as a controller simulation environment for simulating the automation controller. This embodiment of the invention is e.g. a software-in-the-loop simulation environment.

Using such simulation environments enables the testing of a control program solely based on simulation tools. This enables the design and testing of a control program without even using any hardware, which is then later used in the automation system. This embodiment enables, for example, a separation of the setup of the automation system hardware and the development of the control program.

In a further embodiment of the invention, the controller simulation environment forms a first instance of a simulation environment program and the equipment simulation environment forms a second instance of the simulation environment program. This embodiment considerably simplifies the setup and handling of a system for validating the control program in accordance with disclosed embodiments, because it allows the use of similar software environments for simulating the controller and simulating the apparatus or device of the automation system. The possibility of using the simulation environment program for both simulation environments is, among others, enabled by the fact, that the control program as well as the simulation program are created in a controller programming language. This enables appropriate simulations to be executed within similar software environments.

For example, such simulation environment program that could be a software program for simulating a controller are established for executing a program created in a controller programming language. The simulation program is also written in a controller programming language. As a result, it also can be executed using such software program for simulating a controller.

The simulation environment program can be realized as a software program and/or software program code stored in the memory, for example in an electronic memory, magnetic memory, disk memory, RAM, ROM, EPROM or comparable memory. It can, for example, be stored as an executable version or as a software, which has to be compiled and/or installed on a computer, computer device, computer network or the like before being executed.

The simulation environment program can be defined as a sequence of instructions that indicates which operations the computer should perform. The simulation environment program can be stored, e.g., as a "source code version", which is, e.g., the version that was originally written by humans using a programming language. In many cases, it has been translated by a compiler into "object code" or "binaries" before execution.

An instance of the simulation environment program is understood to be a copy of an executable version or implementation of the simulation environment program on a computer. It can, for example, be written or stored into a computer's, computer system's or computer network's memory.

Such an executable version of the simulation environment program is a version of this program that is understandable by a computer's central processing unit and that is ready to run as soon as it is copied from storage (e.g., an electronic memory, disk memory, RAM, ROM, EPROM, or comparable) into the working memory related to the central processing unit.

It is also an object of the invention to provide a method for validating a control program for an automation system, using a system for validation of a control program according to the present description, where the automation system comprises an automation controller for executing the control program and an apparatus or device, and where the control program is created in a first controller programming language and is established to control the apparatus or device when executed by the automation controller.

The method for validating the control program comprises generating a simulation program for simulating a behavior of the apparatus or device or parts thereof, where the simulation program is created in the first controller programming language or a second controller programming language, implementing the simulation program in the equipment simulation environment, implementing the control program in the controller environment, setting up a communicative coupling between the equipment simulation environment and the controller environment to enable a simulation of the automation system, and starting the simulation of the automation system.

Due to the fact, that both, the simulation program and the control program, are created in a controller programming language, similar systems can be used for the control environment and the equipment simulation environment. This makes a method for validating a control program according to the present invention simpler in comparison to prior art methods.

The automation system, the automation controller, the control program, the apparatus or device, the first and second controller programming language, the simulation program, the equipment simulation environment, the communicative coupling between the equipment simulation environment and the controller environment and/or the simulation of the automation system can be configured in accordance with the present invention.

The simulation of a behavior of the apparatus, device or parts thereof can be performed such that an electrical, mechanical, pneumatic, physical and/or similar behavior of the apparatus, device or parts thereof is simulated by the simulation program.

The start of the simulation can comprise starting execution of the simulation program within the equipment simulation environment, and starting execution of the control program within the controller environment.

Such a start of the simulation can additionally comprise starting or enabling the transfer of input and/or output data of the control program between the controller environment and the equipment simulation environment.

In a preferred embodiment, the system for validating the control program can comprise a communication software module in accordance with the present invention. Here, the start of the transfer of input and/or output data of the control program between the controller environment and equipment simulation environment involves the use of the communication software module.

The method can further comprise selecting at least one module behavior component corresponding to the simulation program from an equipment simulation database before generating the simulation program, where the simulation database stores behavior components for the apparatus or device or parts thereof.

The at least one module behavior component, the simulation program, the equipment simulation database and/or the apparatus or device or parts thereof can further be configured in accordance with the present invention.

In a further preferred embodiment, the step of generating the simulation program comprises generating the simulation program based on the at least one module behavior component. Such a generation of the simulation program is based on the at least one module behavior component can be established in accordance with the present invention.

Additionally, the control program can form part of engineering data for the automation system, being stored in an automation engineering system, whereas the automation engineering system is or can be communicatively coupled to the system for validation of the control program.

The control program, the engineering data, the automation system, the automation engineering system and/or the system for validation of the control program can be configured in accordance with the present invention.

The engineering data for the automation system can, for example, be stored in the automation engineering system, where the automation engineering system is configured to engineer the automation system by generating the engineering data for the automation system.

The engineering data can further comprise ID-information regarding the apparatus or device or parts thereof. Here, the method can further comprise importing the ID-information from the automation engineering system before generating the simulation program. The ID-information can be established in accordance with the present invention.

The generation of the simulation program can be based on the ID-information or an additional analysis of the ID-information. Such generation of the simulation program based on this information can again be established in accordance with the present invention.

In case the generation of the simulation program is based on the at least one module behavior component stored in the equipment simulation database, such selection of the at least one module behavior component from the equipment simulation database can be based on the ID-information and/or an analysis of the ID-information.

The method for validating the control program can in that case be performed such that the import of the ID-information is performed before selecting the at least one module behavior component from the equipment simulation database.

The engineering data can further comprise a variable list regarding input data used by the control program and/or output data generated by the control program. Here, the method for validation the control program can further comprise importing the variable list from the automation engineering system and defining the transfer of the controller input data and controller output data between the controller system and the equipment simulation system.

Such a definition of the transfer of controller input data and controller output data between the controller system and the equipment simulation system can be established in accordance with the present invention. The definition of this transfer of data can, for example, happen after importing the variable list and/or after an analysis of the variable list and/or based on the variable list.

Further, such definition of the transfer of controller input and output data between the controller system and the equipment simulation system can further be part of the establishment of the communicative coupling between the equipment simulation environment and the controller environment for enabling the simulation of the automation system in accordance with disclosed embodiments of the present invention.

Such a definition of the transfer of controller input and output data between the controller system and the equipment simulation system can be also a special embodiment of the communicative coupling of the controller environment to the equipment simulation environment.

The definition of the transfer of the controller input data and the controller output data between the controller environment and equipment simulation environment can comprise assigning controller input data to output data, generated by the simulation program. This step can, for example, comprise the analysis of a variable list regarding the controller input data and the analysis of a comparable variable list regarding the output data generated by the simulation program.

Such a comparison of such lists can, for example, comprise the comparison of variable names and/or one or more elements of meta data or ID information (e.g., of related devices or components) regarding variables in those lists. Appropriate variables of the controller input data can be assigned to corresponding ones generated by the simulation program based on such analysis. So, for example, the meta data regarding a speed value of a motor being part of the apparatus or device can contain the information, that this value is about the speed of a motor with a given ID. Such information can also be contained in the meta data of a variable for which the value is generated by the simulation program.

During the definition of the transfer of the data between the controller environment and the equipment simulation environment such variables can be assigned to each other to define such communication.

In a similar way, controller output data can be assigned to corresponding data used by the simulation program.

Such a definition of the transfer of the controller input data and control output data between the controller environment and equipment simulation environment can be performed manually, in an automatic manner or in a semi-automatic manner. Such an automatic manner or semi-automatic manner can be performed such that a variable list regarding controller input and/or output data is compared to a corresponding variable list regarding data being used and/or output by the simulation program. By comparing one or more kinds of information contained in such lists, such as variable names, variable IDs and/or different kinds of meta data contained in such lists, the respective variables are assigned to each other. In a following step, such assignment can be further amended by a user.

The definition of the transfer of the data between the controller environment and the equipment simulation environment can also be performed by a user. To assist a user during the assignment of control program in- and output data to data used and produced by the simulation program, the system for validating the control program can be configured to output respective variable lists according to the present description to a user, for example, using a graphical user interface shown on a display device. The system for validating the control program can be further configured to enable the user to directly graphically connect corresponding control program variables and simulation program variables using such a graphical user interface.

The method for validating the control program can further comprise generating a simulation engineering project within the automation engineering system or a further automation engineering system, and implementing the simulation program within the simulation engineering project.

Alternatively, the method for validating the control program can further comprise generating a simulation engineering project within the automation engineering system, where the simulation engineering project comprises the simulation program.

Such embodiments enable a simpler setup of the system and/or method for validating the control program, because setting up a project in such an automation engineering system containing the simulation program enables the use of existing tools for creating, amending and handling the simulation program, because such tools are especially made for programs written in a controller programming language. Those tools may, for example, be tools for amending and checking program code, for error analysis, for compiling such code and/or for validating such code.

In a preferred embodiment, the controller environment comprises a controller simulation environment in accordance with the present invention for simulating the automation controller. Such an embodiment enables a software-in-the-loop-system, in which the controller and the apparatus or device of the automation system are simulated to validate the control program.

In this case of the controller environment being realized as a controller simulation environment in accordance with the present invention, the method for validating the control program can further comprise generating the controller simulation environment as a first instance of a simulation environment program and generating the equipment simulation environment as a second instance of the simulation environment program.

The simulation environment program and an instance of this simulation environment program can further be configured in accordance with the present invention. Such an embodiment further simplifies the setup of a system and/or method for validating a control program in accordance with the present invention, because it enables the execution of the control program as well as of the simulation program in similar simulation environments. This, for example, enables e.g., a much easier setup of such system, because only one type of tools is involved. It also enables, e.g., a much easier communication between the simulation environment and the controller environment, because both environments have a similar structure and configuration. Such similar structures could, for example, be a similar structure regarding communication of data or regarding the structure, how data is stored and used within the system.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be explained by way of example in more detail with reference to the accompanying figures, in which:

FIG. 6 is a third exemplary block diagram of a process for setting up and running an exemplary system for validating a control program using a hardware-in-the-loop concept in accordance with the invention; and FIG. 7 is a flowchart of the method in accordance with the invention.

DETAILED DESCRIPTION OF THE EXEMPLARY EMBODIMENTS

Figure 1:
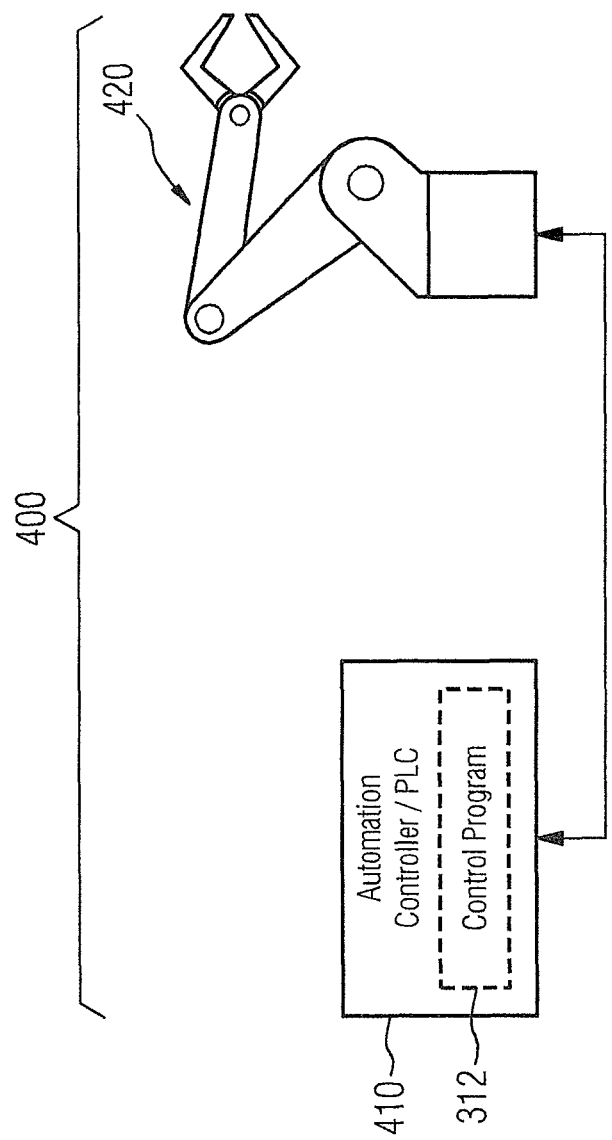
FIG. 1 is a schematic illustration of an exemplary automation system in accordance with the invention.

FIG. 1 shows an example for an automation system 400 comprising a robot 420 and an automation controller 410 or PLC 410. The automation controller 410 comprises a control program 312 which, when executed in the automation controller 410, controls the robot 420, such as a movement of the robot 420.

Figure 2:
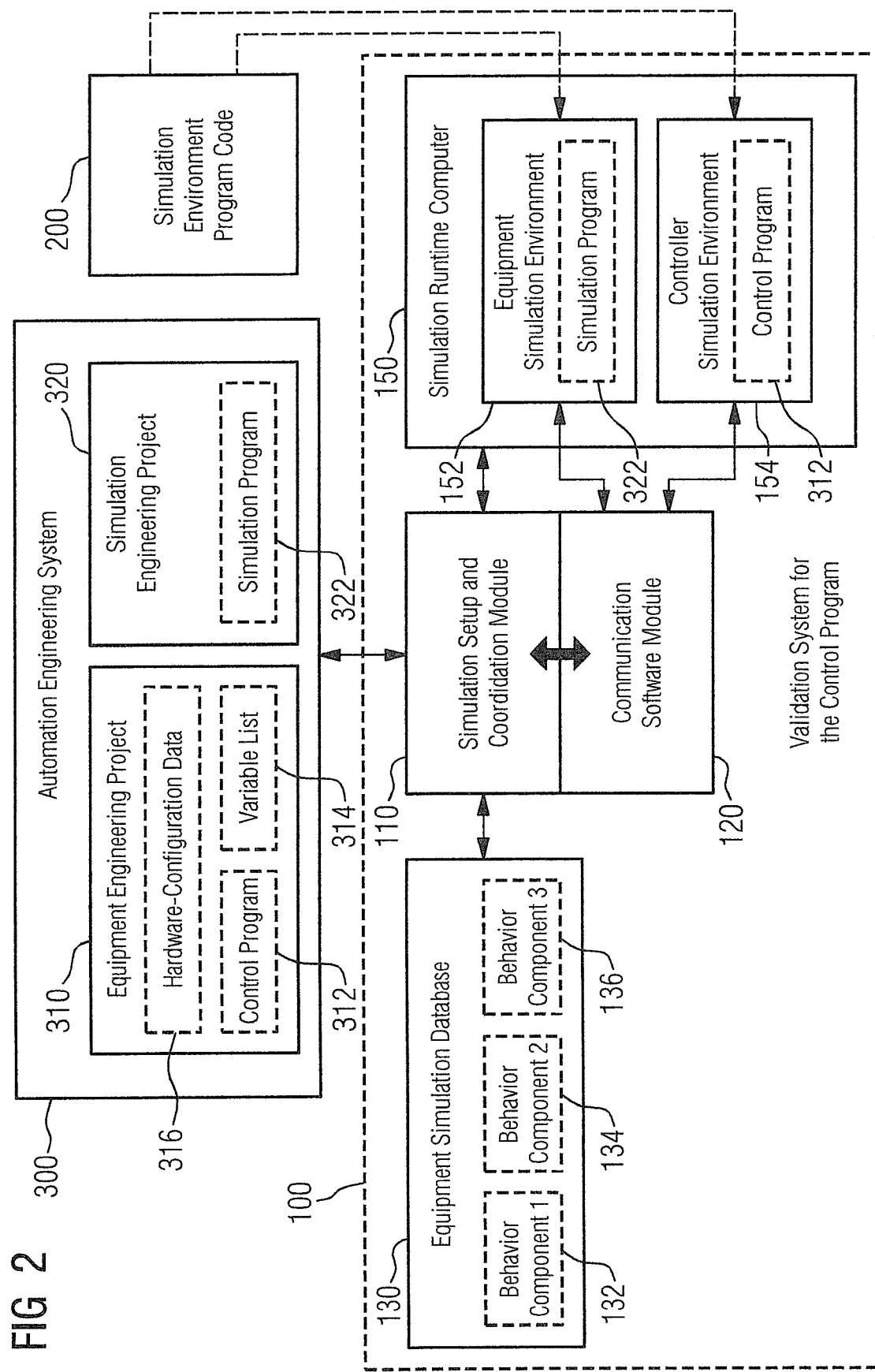
FIG. 2 is a schematic illustration of an exemplary simulation system for validating a control program using a software-in-the-loop concept in accordance with the invention.

FIG. 2 shows a validation system 100 for the control program 312. As depicted in FIG. 2, the control program 312 is stored within an automation engineering system 300 comprising an equipment engineering project 310 and a simulation engineering project 320. The equipment engineering project 310 comprises the control program 312 and further comprises engineering data regarding automation of the automation system 400 shown in FIG. 1.

A further part of this automation engineering project 310 is hardware configuration data 316 containing, e.g., equipment information and parameters regarding components of the automation system 400. In the present example, those components are the robot 420 and the PLC 410. The hardware configuration data 316, for example, comprises ID-information regarding the robot 420 and/or components, modules or parts of this robot 420, being, for example, a type name, type or model number and/or an order number or serial number of the robot 420 or its parts, modules or components. The hardware configuration data 316, for example, further comprises ID-information regarding the PLC 410 and/or components, modules or parts of this PLC 410, being again, for example, a type name and/or type or model number and/or an order number or serial number of the PLC 410 and/or components, modules or parts of the PLC 410.

The equipment engineering project 310 further comprises a variable list 314 comprising, e.g., names, definitions, meta-data and/or addresses regarding variables used by the control program 312, e.g., variables containing input data of the control program 312 and variables containing output data of the control program 312.

The simulation engineering project 320 comprises the simulation program 322 for simulating the robot 420.

FIG. 2 further shows a simulation system 100 or validation system 100 comprising a simulation runtime computer 150. This validation system 100 is an example of a system for validating a control program in accordance with the present invention. The simulation runtime computer 150 comprises an equipment simulation environment 152 and a controller simulation environment 154. The controller simulation environment 154 is a simulation environment for simulating the PLC 410 of the automation system 400 (see FIG. 1). The controller simulation environment 154 contains a copy or the control program 412 or a compiled version of the control program 312. The controller simulating environment 154 is configured to execute the control program 312 or the compiled version of the control program 312 as if it was run by the PLC 410.

The control program 312 is written in a PLC programming language in accordance with the present invention. The control program 312 can be written in any of such languages. For example, the IEC 61131-language "Ladder Diagram" (LD) or "Function Block Diagram" (FBD) could be used preferably for typical control programs 312.

The equipment simulation environment 152 contains the simulation program 322 for simulating the robot 420 of the automation system 400 or a compiled version of this simulation program 322. If executed by the equipment simulation environment 152, then the simulation program 322 or compiled version of the simulation program 322 simulates the behavior of the robot 420 of the automation system 400 or an aspect of the behavior of the robot 420 or parts thereof. Such aspects of the behavior could, e.g., be an electrical behavior, a mechanical, behavior, a mechatronic behavior, an automation relevant behavior, a thermodynamic behavior and/or a pneumatic behavior of the robot 420 or parts thereof.

The simulation program 322 is also written in a PLC programming language in accordance with the present invention. The simulation program 322 can be written in any of such languages. For such simulation programs 322, for example, the IEC 61131-languages "Structured Text" (ST) or "Sequential Function Chart" (SFC) could be used preferably.

Output data generated by the control program 312 being executed by the controller simulation environment 154 is communicated to the equipment simulation environment 150 via a communication software module 120, being also part of the validation system 100. Such output data corresponds to the output data generated by the PLC 410 when executing the control program 312 to control the robot 420. Therefore, this output data is used as input data for the equipment simulation environment 152 running the simulation program 322 for simulating the robot 420.

This robot simulation then simulates the behavior of the robot 420 using this controller output data as input control data to control the robot 420, e.g., to generate relevant sensor, actor and other output data characterizing the behavior of the robot 420 simulated by the equipment simulation environment 152 by executing the simulation program 322.

Such simulation output data is communicated back to the controller simulation environment 154 via the communication software module 120 and is then used as input data for the simulation of the controller 410 of the automation system 400, being realized by the controller environment 154 running the control program 312. This communication is again performed via the communication software module 120 coordinating such data communication.

The assignment of such controller output data to equipment simulation input data and equipment simulation output data to controller input data is described in more detail in connection to the FIG. 4 and following.

In a preferred embodiment of the communicative coupling between the equipment simulation environment 152 and the controller simulation environment 154, the controller simulation environment 154 can output its data in the form of fieldbus telegrams. Such fieldbus telegrams can be established according to typical fieldbus-standards used in automation networks, such as ProfiNet, Profibus, EtherCat, Ethernet-IP or comparable fieldbus standards. The input of data into the controller simulation environment 154 can also be performed in the form of fieldbus telegrams in accordance with the present invention. In the same way, the input and/or output of data into and out of the equipment simulation environment 152 can be also performed in the form of such fieldbus telegrams in accordance with the present invention. In a further preferred embodiment, the communication between the equipment simulation environment 152 and controller simulation environment 154 can be performed using fieldbus telegrams. This embodiment has the advantage that, for example, the control program 312 and/or a component thereof, being established to obtain and send fieldbus telegrams, can more easily be used within the validation system 100 according to the present description. Such a component of the control program 312 could be, for example, a sub-program and/or a "function block" (e.g., a function block as defined by IEC standard 61131-3 and/or IEC 61499). In the same way, simulation components and/or behavior components also being designed for receiving and/or sending fieldbus telegrams, can be more easily used within the validation system 100.

By way of this embodiment, it is also possible to not only simulate and/or test the control program 312 working together with the robot 420 but also to simulate a possible fieldbus communication between the automation controller 410 and the robot 420.

FIG. 2 further shows a simulation environment program code 200 being stored on a separate computer hardware. The equipment simulation environment 152 is realized as a first instance of this simulation environment program code 200, whereas the controller simulation environment 154 is realized as a second instance of this simulation environment program code 200. Such instances can be established in accordance with the present invention. Both instances are implemented within the same simulation runtime computer 150 in the embodiment depicted in FIG. 2. In another possible embodiment, they also could be implemented on different computer hardware.

The simulation environment program code 200 could, for example, be realized as a PLC simulation software. The usage of such PLC simulation software is possible in this case, because both the control program 312 and the simulation program 322 are written in a PLC programming language.

The fact that both simulation programs 312, 322 are written in a PLC programming language simplifies the generation and setup of such validation system 100 considerably. So, for example, a user generating the simulation programs 312, 322 has only to deal with one environment for generating such programs. Such environment could, for example, be an automation engineering system in accordance with the present invention, which is usually used for generating control programs, and which can here also be used for generating the simulation program 322. So, the user can fully work insight, for example, an automation engineering system 300 for generating all the program code 312, 322 needed for validation of the control program 312.

Another advantage of having both programs, the control program 312 and the simulation program 322, written in a PLC programming language is that, similar software environments, or the same ones, can be used for executing those simulation programs 312, 322. This also eases the handling of the system, because the user only has to deal with one simulation environment type. In the embodiment shown in FIG. 2, both simulation environments 152, 154 are instances of even the same simulation environment code 200.

If the same simulation environment program code 200 is used to generate the equipment simulation environment 152 and the controller simulation environment 154, also the communication between the equipment simulation environment 152 and the controller simulation environment 154 is easier to be arranged and setup. This is the case, because then both simulation environments 152, 154 have a similar or the same communication structure, which is then easier to align and to coordinate compared to communication structures of two different simulation environments. The setup of the communication between the equipment simulation environment 152 and the controller simulation environment 154 will be explained in more detail by way of examples shown in FIG. 4 and following.

FIG. 2 also shows a simulation setup and coordination module 110, that has, for example, the functionality for triggering the setup or for establishing the simulation environments 152, 154 with the simulation program 322 and control program 312, respectively. It additionally has the functionality of coordinating the simulation of the robot 420 by the equipment simulation environment 152 with the simulation of the controller 410 by the controller simulation environment 154.

Such coordination can, for example, involve the management of a time synchronization of both simulations. Such time synchronization can, for example, be performed by using, e.g., one or more internal clocks within the equipment simulation environment 152 and the controller simulation environment 154 according to methods for synchronizing two conventional simulations.

Such synchronization and coordination of the two simulations is described via a special example in the following. In this example, the controller simulation environment 154 and the control program 312 are configured to cyclically execute the control program 312. This is established such that, after the execution of one cycle of the control program 312, output data produced by the control program 312 during the execution of this program cycle is stored in an output process image memory area within the controller simulation environment 154 and afterwards output by the controller simulation environment 154 via the communication software module 120 to the equipment simulation environment 152. In parallel, there is also an input process image memory area implemented within the controller simulation environment 154 for storing controller input data to be used as input data for the control program. In this input process image memory area, simulation output data generated by the equipment simulation environment 152, by execution of the simulation program 322, is stored to be subsequently used by the control program 312 during the execution of the following program cycle.

The time coordination between the controller simulation and the equipment simulation can be performed, for example, by including an end-time value of the respective program cycle in the transfer of the controller output data, produced within this program cycle, to the equipment simulation environment 152. This end-time value is then used to set an appropriate clock-value within the equipment simulation environment 152 for the simulation of the robot 420. Using such a time coordination, both simulations can be accordingly correlated by use of coordination methods known for the synchronization of simulations from prior art.

The time value used as the end-time of the respective program cycle can, for example, be an actual time value of a clock running inside the controller simulation environment 154 or an external clock used by the controller simulation environment 154. The end-time value can also be a time value for example calculated using, e.g., a counter-value for the respective program-cycle multiplied with a cycle time being preset within the controller simulation environment 154 or being settable and/or be amendable by a user. Such a counter-value could, e.g., be generated by a counter, counting the program cycles of the control program 312.

Such setting or amending of cycle times can, for example, be used to simulate a cycle time realized by a special controller hardware or for speeding up or delaying the simulation of the automation system 400.

The time coordination between the equipment simulation environment 152 and the controller simulation environment 154 can also be handled by the simulation setup and coordination module 110. This can, for example, be achieved in a similar way as described above or other ways for synchronizing different simulations known from the prior art.

FIG. 2 also shows an equipment simulation database 130 that is also part of the validation system 100. This equipment simulation database 130 comprises different behavior components 132, 134, 136. The equipment simulation database 130 and the behavior components 132, 134, 136 can be established in accordance with the present invention. The equipment simulation database 130 can be located within a separate computer or data processing unit, as depicted in FIG. 2. The equipment simulation database 130 can, for example, be also arranged and set up within the automation engineering system 300 and/or the simulation setup and coordination module 110 and/or the simulation runtime computer 150.

The behavior components 132, 134, 136, are software simulation modules for simulating different hardware components or devices for automation systems or parts thereof. Such hardware components can be, for example, motors, inverters, sensors, pieces of communication equipment, all kinds of computers and data processing units, HMI-devices or parts thereof, passive communication components, mechanical components and further components, devices, or parts thereof which can be part machines, plants and/or automation systems.

The behavior components 132, 134, 136 within the equipment simulation database 130 are written in a PLC programming language in accordance with the present invention, preferably in a PLC programming language subsequently used for the creation of appropriate simulation programs.

In the example shown in FIG. 2, the three behavior components 132, 134, 136 depicted are simulation modules for parts of the robot 420 shown in FIG. 1. Those three behavior components 132, 134, 136 are written in the same PLC programming language, in which the simulation program 322 is written.

To create the simulation program 322 for simulating the robot 420, the three behavior components 132, 134, 136 shown in FIG. 2 are extracted from the equipment simulation database 130 and arranged such that the complete robot 420 is simulated by this arrangement of behavior components 132, 134, 136. This arrangement is performed according to methods for combining different simulations known from the prior art.

This arrangement of the behavior components 132, 134, 136, is either used directly as the simulation program 322 for simulating the robot 420 is created or used as the basis for creating the simulation program for simulating the robot 420.

This selection of the necessary behavior components 132, 134, 136 for simulating the complete robot 420 from the equipment simulation database 130 can be performed, for example, by the simulation setup and coordination module 110. The information, which of the behavior components stored in the equipment simulation database 130 are needed to simulate the robot 420, can for example be determined from engineering data taken from the equipment engineering project 310. This process will be explained in more detail in relation to FIG. 4.

The simulation setup and coordination module 110 can be also configured to create the simulation program 322 for simulating the robot 420 based on the relevant behavior components 132, 134, 136 extracted from the equipment simulation database 130.

Further functions of the simulation setup in coordination module 110 will be explained in more detail in relation to FIG. 4.

Figure 3:
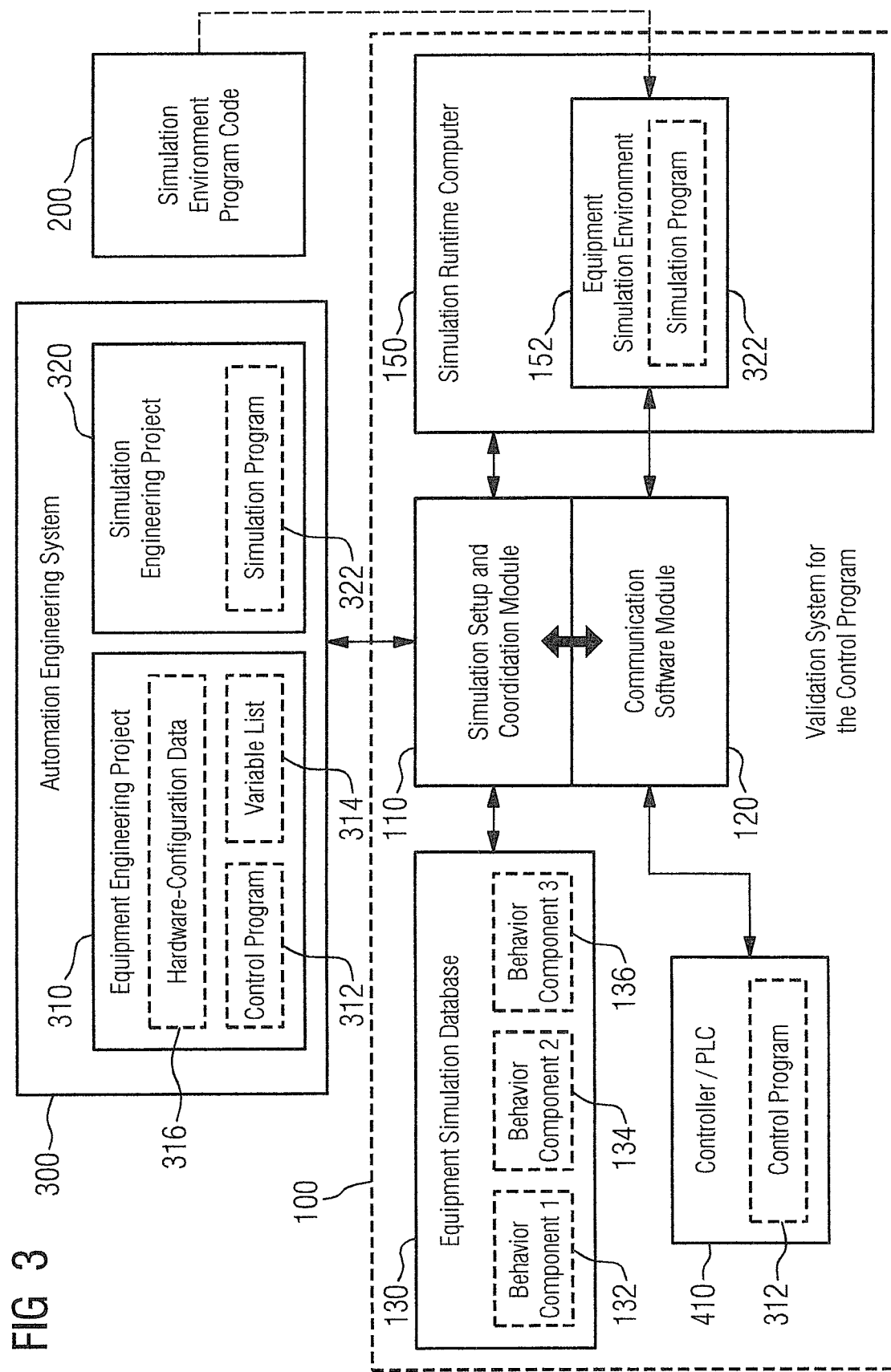
FIG. 3 is a schematic illustration of a further exemplary simulation system for validating the control program using a hardware-in-the-loop concept in accordance with the invention.

FIG. 3 shows another realization example for the validation system 100 in a "hardware in the loop" setup. In this setup, the controller 410 of the automation system 400, shown in FIG. 1, is not simulated by an appropriate controller simulation environment like in the embodiment shown in FIG. 2, but is used directly within the validation system 100.

In this setup, the control program 312 is executed by the PLC 410. The controller output data generated while executing the control program 312 is then communicated in a similar way between the controller/PLC 410 and the equipment simulation environment 152 like it was done in the previous example discussed in relation to FIG. 2 between the controller simulation environment 154 and the equipment simulation environment 152. Also, the coordination between the equipment simulation environment 152 and the controller/PLC 410 is achieved in a similar way than explained related to FIG. 2 between the equipment simulation environment 152 and the controller simulation environment 154.

Figure 4:
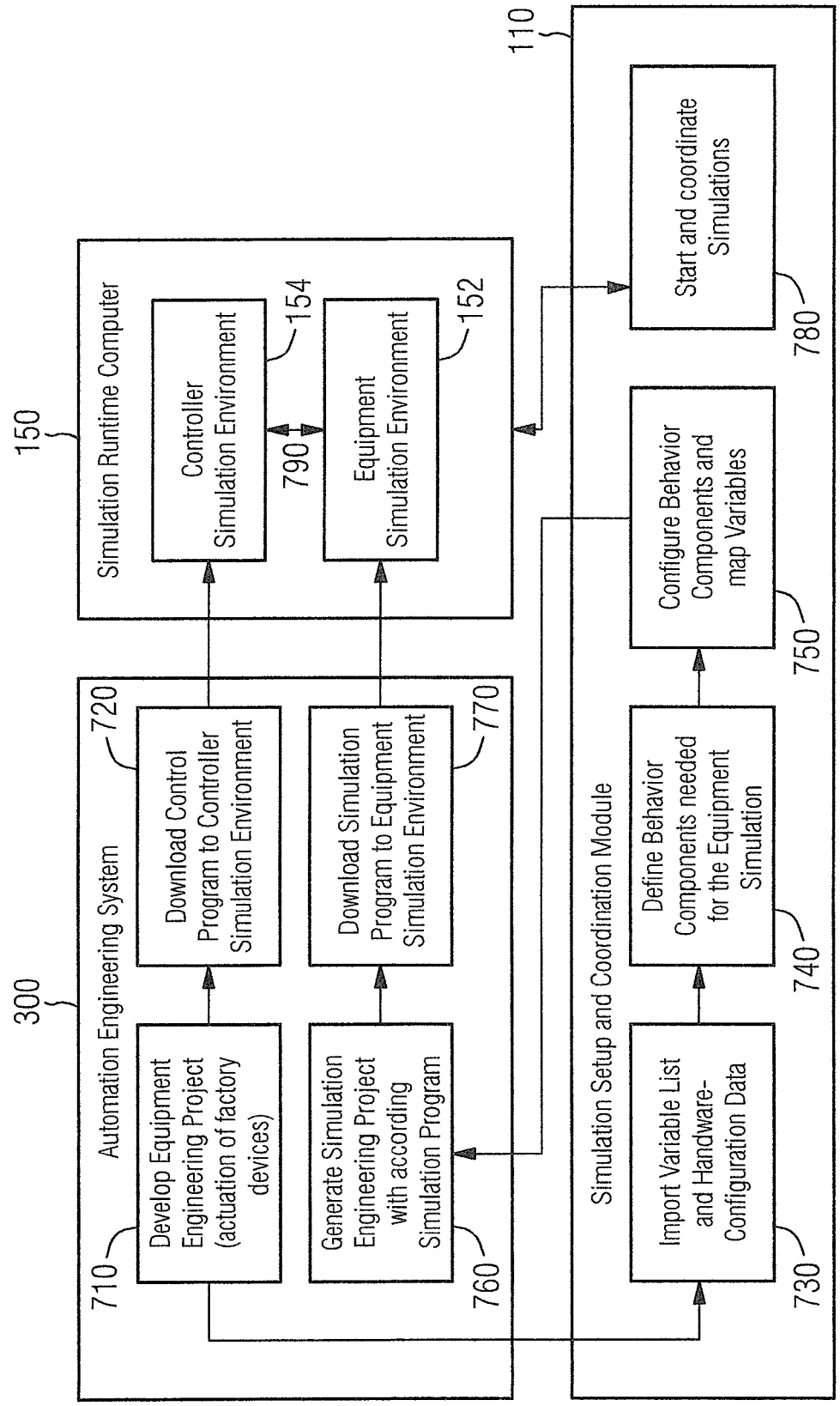
FIG. 4 is a further exemplary block diagram of a process for setting up and running an exemplary system for validating a control program using a software-in-the-loop concept in accordance with the invention.

FIG. 4 shows an example of a method or process flow for the generation of a validation system 100 as shown in FIG. 2. To more clearly show, in which of the components shown in FIG. 2 the respective process steps are executed or essentially executed, FIG. 4 additionally schematically shows the automation engineering system 300, the simulation setup and coordination module 110 and the simulation runtime computer 150 (with the controller simulation environment 154 and the equipment simulation environment 152 implemented therein).

The designation of the automation system 400, the validation system 100, the simulation environment program code 200, the automation engineering system and of their individual components used in the following description of the FIGS. 4 to 6 refers to the designation of those components used in FIGS. 1 to 3.

In the example shown in FIG. 4, the control program 312 is developed within the automation engineering system 300 and is stored therein as part of the appropriate equipment engineering project 310 established for the automation of the automation system 400 shown in FIG. 1.

FIG. 4 shows as a first step 710 the development of the equipment engineering project 310. This equipment engineering project 310 comprises the control program 312 for subsequent execution by the controller 410 of the automation system 400. It additionally comprises the hardware configuration data 316 containing the relevant parameters for the hardware included in the automation system 400. This has been already described in relation to FIG. 2. Additionally, the equipment engineering project 310 comprises the variable list 314 containing information about the variables used by the control program 312. These components of the equipment engineering project have been already described in detail in relation to the description of FIG. 2.

In a next step 720, the control program 312 is downloaded to the controller simulation environment 154 within the simulation runtime computer 150. This download is triggered by the simulation setup and coordination module 110 and performed by the automation engineering 300.

In a next step 730, the hardware configuration data 316 of the equipment engineering project 410 is then imported into the simulation setup and coordination module 110. This import is also triggered and handled by the simulation setup and coordination module 110. Then, also within step 730, this hardware configuration data 316 is analyzed by the simulation setup and coordination module 110 to extract ID information about the different hardware components used within the automation system 400. Via the analysis, e.g., of this ID information, the components of the robot 420 relevant for controlling this robot, are identified.

Additionally, within step 730, the variable list 314 is imported from the equipment engineering project 310 into the simulation setup and coordination module 110. The analysis and use of this variable list 314 will be described in more detail in relation to the mapping of the variables between the behavior components 132, 134, 136 or the simulation program 322 and the control program 312.

In a further step 740 shown in FIG. 4, the simulation setup and coordination module 110 searches for behavior components 132, 134, 136 for all components necessary for simulating the automation of the robot 420. As a first step, the simulation setup and coordination module 110 searches the equipment simulation database 130 shown in FIGS. 2 and 3 for appropriate behavior components 132, 134, 136 relating to those robot components. In the example described herein, the robot 420 consists of three components relevant for simulating its automation and the three behavior components 132, 134, 136 shown in the FIGS. 2 and 3 correspond to those three relevant robot components. Using the respective ID information taken from the hardware configuration data 316, the simulation setup and coordination module 110 identifies the respective behavior components 132, 134, 136 and extracts them from the equipment simulation database 130.

In case, the simulation setup and coordination module 110 cannot identify the respective behavior components necessary for simulating the robot 420 within the equipment simulation database 130, or cannot identify all of the behavior components, the simulation setup and coordination module 110 may prompt a user for inputting information, where to find the respective behavior components, or for inputting ID information or names of the respective behavior components. Alternatively, a user can also directly input the information to get access to such behavior components or even directly input or load them into the simulation setup and coordination module 110.

Additionally, after automatically choosing behavior components, the simulation setup and coordination module 110 can also prompt a user, whether the chosen behavior components chosen automatically are correct. Then a user may change, remove and/or add one or more behavior components, if those are not chosen correctly.

In a next step 750, the simulation setup and coordination module 110 configures the respective behavior components using the parameters included in the hardware configuration data 316 for the respective robot components. Here, a user may be also prompted by the simulation setup and coordination module 110 after automatically setting such parameters, to eventually change, remove and/or add one or more parameters in the configuration of the respective robot component.

Then, within the step 750, variables used by the behavior components 132, 134, 136 are mapped on variables used by the control program 312.

The variables used by the control program can consist of control program input variables relating to the controller input data and of control program output variables relating to the controller output data. The variables used by the simulation program can consist of simulation program input variables relating to simulation input data and simulation program output variables relating to simulation output data.

Similarly, also the behavior components 132, 134, 136, have appropriate in and output variables relating to the respective in and output data for the respective behavior components 132, 134, 136.

Generally, the mapping of the variables can, e.g., be performed between simulation program variables and control program variables or between behavior component variables and control program variables. In the following, such mapping is described for the mapping of behavior component variables and control program variables. The mapping of simulation program variables and control program variables can be performed similarly.

The mapping of the variables used by the behavior components 132, 134, 136 on variables used by the control program 312 can, for example, be done manually by a user. For this purpose, the simulation setup and coordination module 110 can, for example, display a list on a display device showing all input variables of the control program 312 and output variables of the control program 312. The variables and information regarding those variables contained in this control program variable list are taken from the variable list 314 imported from the automation engineering system 300. Either part of the information or all information contained in the variable list 314 relating to the in- and output-variables of the control program 312 contained in that list can be displayed. Such information contained in the variable list 314 can, for example, comprise a variable name, meta information regarding the variable and/or a unit regarding the variable. Further, such information contained in the variable list and used with in the respective display on the user interface can be arranged and setup according to the present description.

Additionally, all in- and output variables of the behavior components 132, 134, 136 necessary for the simulation of the robot 420 or all in- and output variables of the simulation program 322 are also displayed in an appropriate list on the display device together with again the appropriate information regarding the variables as described already in relation to the variables of the control program 312.

Those lists can then, for example, be displayed on different parts of the display device and then, e.g., graphical connections can be drawn by a user between corresponding variables to assign respective output variables of the control program 312 two input variables of a corresponding one of the behavior components 132, 134, 136 or of the simulation program 322 and respective input variables of the control program 312 to output variables of a corresponding one of the behavior components 132, 134, 136 or of the simulation program 322. The information displayed in both lists regarding the variables, as explained above, can help a user to make such assignment. For example, comparing variable names, physical units, device-IDs and/or further meta information regarding the variables can allow a user a clear and easy assignment of such variables.

Such an assignment of variables can also be performed in an automatic way by the simulation setup and coordination module 110 by comparing all information contained in the variable list 314 regarding the variables used by the control program 312 to all information available regarding the variables used by the behavior components 132, 134, 136 used for the simulation of the robot 420 or by the simulation program 322. As described above, for example, comparing variable names, physical units, ID information of related components and other meta information can allow a clear assignment of the control program variables to the behavior component variables.

Such an assignment can, for example, be performed such that, in a first step, all control program variables are assigned to behavior component or simulation program variables in cases, in which this assignment is clearly makeable according to the information available for the respective variables. In a second step, the remaining variables can be assigned in accordance with the present invention.

The assignment of variables can also be performed in a semi-automatic way. In a first step, an automatic assignment of variables can be performed by the simulation setup and coordination module 110 according to the previous description. Then a user can be prompted with the variables not automatically assignable. This can, e.g., be performed by, for example, displaying a list of all non-assigned control program variables and all non-assigned behavior component variables for manual assignment by a user, for example, in accordance with the previous invention.

In any case, after an automatic or semi-automatic assignment of variables of the control program 312 and the behavior components 132, 134, 136 or the simulation program 322, the assignments performed can be displayed on a display device manual correction and amendment by a user.

In case the variable assignment is performed with variables of the control program 312 and those of the simulation program 322, this variable assignment can also be performed within step 760 instead of step 750.

In the following step 760, the simulation setup and coordination module 110 then creates the new simulation engineering project 320 within the automation engineering system. The behavior components 132, 134, 136 taken from the equipment simulation database 130 are then arranged to build the simulation program 322 forming part of this simulation engineering project 320. Such composition can, e.g., be performed using methods known from the prior art. The composition of the simulation program 322 can, e.g., be performed by simply using the collection of behavior components 132, 134, 136 as the simulation program 322. The integration of the behavior components to build the simulation program 322 is relatively easy, because the behavior components 132, 134, 136 are already written in the PLC programming language also used for the simulation program 322.

In the next following step 770, the simulation program 322 is then downloaded from the automation engineering system 300 to the equipment simulation environment 152. This download is triggered by the simulation setup and coordination module 110 and performed by the automation engineering system 300.

The equipment simulation environment 152 is now established with the simulation program 322, and the controller simulation environment 154 is established with the control program 312 and the simulation of the automation system 400 is ready to be started. This start, depicted as step 770 in FIG. 4, is performed and triggered by the simulation setup and coordination module 110 either automatically or after an appropriate user input. By starting the simulations, the simulation setup and coordination module 110 triggers the start of the simulation program 322 and the start of the control program 312 within the controller simulation environment 154. By starting both simulation environments 152, 154 the communication between those simulation environments 152, 154 is also started. This communication is shown as arrow 790 in FIG. 4. In a preferred embodiment, application interfaces (API) provided by the controller simulation environment 154 and the equipment simulation environment 152 respectively can be used for performing the communication between the equipment simulation environment 152 and the controller simulation environment 154. Especially in the case in which the controller simulation environment 154 and the equipment simulation environment 152 are two instances of the same simulation environment program code 200, this simplifies the communication between both simulation environments 154, 152, because both APIs have the same functionality and layout.

The coordination of the equipment simulation environment 152 and the controller simulation environment 154 can be performed according to the methods for coordinating different simulations known from the prior art.

In a preferred embodiment of the method shown in FIG. 4, at some time before starting the simulation within the method step 780, the equipment simulation environment 152 is created as an instance of the simulation environment program code 200 stored on a separate computer. This creation of this instance can, for example, also be triggered and/or performed by the simulation setup and coordination module 110. In a similar way, at some time before starting the simulation within the method step 780 the controller simulation environment 154 can be also created as a second instance of the simulation environment program code 200. The creation of this controller simulation environment 154 can also be triggered and/or performed by the simulation setup and coordination module 110.

Figure 5:
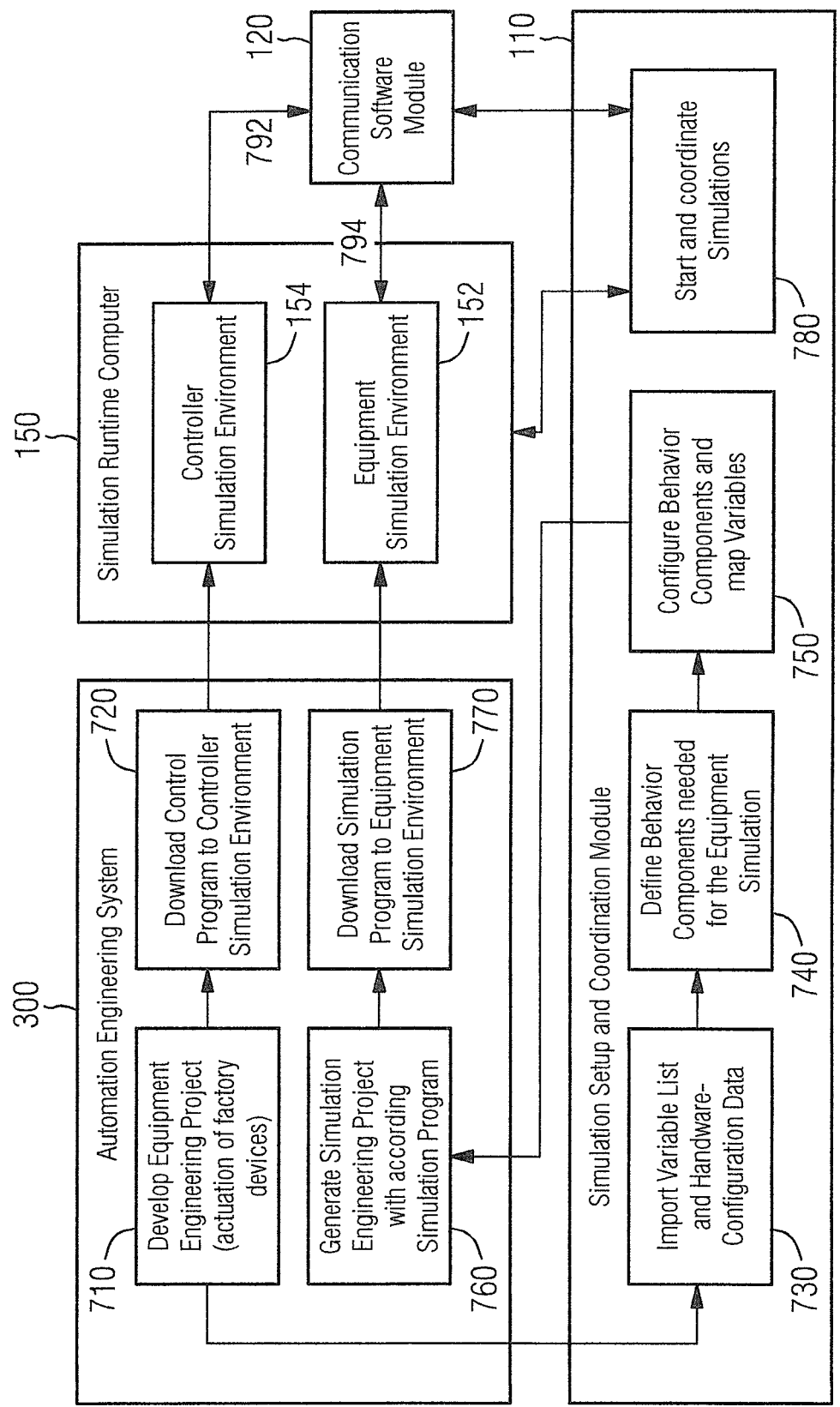
FIG. 5 is a further exemplary block diagram of a process for setting up and running an exemplary system for validating a control program using a software-in-the-loop concept including a communication software module in accordance with the invention.

The method shown in FIG. 5 is a embodiment of the method already explained in relation to FIG. 4. In the following, only the difference between FIG. 5 and FIG. 4 is explained. The other method steps shown in FIG. 5 correspond to the according ones in FIG. 4.

The only difference between FIGS. 4 and 5 is that, in FIG. 5, the communication between the controller simulation environment 154 and the equipment simulation environment 152 is performed via the communication software module 120.

This implies, that in the step 770 of starting and coordinating the simulation, not only the start of the controller simulation environment 154 and the equipment simulation environment 152 is started, but also the communication software module 120 is started. By starting those three components 154, 152, 120 then also the communication between the equipment simulation environment 154 and the communication software module 120 is started, which is depicted by the arrow 794. Also, the communication between the controller simulation environment 154 and the communication software module 120 is started in parallel, which is depicted by the arrow 792 in FIG. 5.

This communication can then be performed in accordance with the presently disclosed embodiments of the invention and/or in accordance with methods known from the prior art.

FIG. 6 shows another alternative implementation to the methods shown in FIGS. 4 and 5. In FIG. 6, an example of a setup procedure for setting up a hardware-in-the-loop validation system according to FIG. 3 is depicted.

In the following, only the differences between FIG. 5 and six are described. The other process steps shown in FIG. 6 correspond to the respective ones shown in FIG. 5.

In the hardware-in-the-loop setup shown in FIG. 3, the control program 312 is executed by the controller 410. Therefore, the download step 720 of the control program in FIG. 6 is performed to the hardware controller 410 or PLC 410. The step 770 of starting the simulation in FIG. 6 then also includes the start of the execution of the control program 312 by the controller 410 in addition to the start of the execution of the simulation program 322 within the equipment simulation environment 152 in the simulation runtime computer 150. Similarly, during the start of the communication between the controller 410 and the equipment simulation environment 152 via the communication software module 120 the communication between the controller 410 and the communication software module 120 is also started, which is shown in FIG. 6 as arrow 796.

FIG. 7 is a flowchart of the method for validating a control program 312 for an automation system 400 utilizing a system for validating a control program 100, where the control program 312 is created in a first controller programming language and is arranged and set up to control either an apparatus 420 and/or a device of the automation system 400 when executed by an automation controller 410 of the automation system 400.

The method comprises generating the simulation program 322 for simulating a behavior of either the apparatus 420 or the device and/or parts thereof, as indicated in step 710.

In accordance with the invention, the simulation program 322 is created in either the first controller programming language or a second controller programming language.

Next, the simulation program 322 is implemented in the equipment simulation environment 152, as indicated in step 720.

Next, the control program 312 is implemented in the controller environment 154, 410, as indicated in step 730.

Next, a communicative coupling is set up between the equipment simulation environment 152 and the controller environment 154, 410 to enable a simulation of the automation system 400, as indicated in step 740.

Next, the simulation of the automation system 400 is started, as indicated in step 750.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for validating a control program for an automation system, the control program being created in a first controller programming language and being arranged and setup to control one of (i) an apparatus and (ii) a device of the automation system when executed by an automation controller of the automation system, the system comprising:
    a simulation runtime computer;
    a controller simulation environment for executing the control program on the simulation runtime computer;
    an equipment simulation environment for executing a simulation program on the simulation runtime computer to simulate one of (i) a behavior of the apparatus, (ii) a device and (iii) parts of the device;
    wherein the equipment simulation environment is communicatively coupled to the controller environment to at least one of (i) enable and (ii) perform a simulation of the automation system on the simulation runtime computer; and
    wherein the simulation program is created in one of (i) the first controller programming language and (ii) a second controller programming language which are each executed in the same type of simulation system.

2. The system according to claim 1, wherein the controller simulation environment cyclically processes the control program and outputs a cycle end time value at an end of a program cycle of the control program.

3. The system according to claim 2, wherein a time for the execution of one cycle of the control program has a cycle time value; and
    wherein after processing a first cycle of the control program, a first cycle end time value is output, and after execution of a subsequent execution of the control program a second cycle end time value is output, the second cycle end time value being based on the first cycle end time value and the cycle time value.

4. The system according to claim 3, wherein the controller simulation environment is arranged and configured to determine the cycle time value utilizing a clock.

5. The system according to claim 3, wherein the cycle time value is a predetermined value.

6. The system according to claim 4, wherein the cycle time value is a predetermined value.

7. The system according to claim 5, wherein the cycle time value is a predetermined value is one of settable and changeable by a user.

8. The system according to claim 6, wherein the cycle time value is a predetermined value is one of settable and changeable by a user.

9. The system according to claim 1, wherein the system is communicatively coupled to an automation engineering system for receiving automation system engineering data from the automation engineering system;
    wherein the automation engineering system configured to engineer the automation system by generating the automation system engineering data; and
    wherein the automation system engineering data comprises the control program.

10. The system according to claim 9, wherein the automation system engineering data further comprises a variable list comprising at least one of (i) input data utilized by the control program and (ii) output data generated by the control program; and wherein the system for validating the control program is further configured to define a transfer of the controller input data and controller output data between the controller simulation environment and the equipment simulation environment.

11. The system according to claim 1, further comprising:
an equipment simulation database for storing behavior components for simulating at least one of (i) technical equipment and (ii) parts of the technical equipment;
wherein the equipment simulation database comprises at least one module behavior component corresponding to the simulation program.

12. The system according to claim 11, wherein the behavior components are created in at least one of (i) the first controller programming language, (ii) the second controller programming language and (iii) at least one further controller programming language.

13. The system according to claim 11, wherein the system for validation of the control program is further configured to select the at least module behavior component from the equipment simulation database.

14. The system according to claim 12, wherein the system for validation of the control program is further configured to select the at least module behavior component from the equipment simulation database.

15. The system according to claim 9, wherein the automation system engineering data comprises ID-information regarding at least one of (i) the apparatus, (ii) the device and (iii) at least parts of the device; and
wherein the system for validation of the control program is further configured to import the ID-information and select the at least one module behavior component from the equipment simulation database.

16. The system according to claim 11, wherein the automation system engineering data comprises ID-information regarding at least one of (i) the apparatus, (ii) the device and (iii) at least parts of the device; and
wherein the system for validation of the control program is further configured to import the ID-information and select the at least one module behavior component from the equipment simulation database.

17. The system according to claim 1, wherein the system is configured to establish the simulation program based on the at least one module behavior component.

18. The system according to claim 17, wherein the system is communicatively coupled to an automation engineering system for receiving automation system engineering data from the automation engineering system;
wherein the automation engineering system configured to engineer the automation system by generating the automation system engineering data; and
wherein the automation system engineering data comprises the control program; and
wherein the system is further configured to generate a simulation engineering project within one of (i) the automation engineering system and (ii) a further automation engineering system, the simulation engineering project comprising the simulation program.

19. The system according to claim 1, further comprising:
a simulation coordination module configured to at least one of:
coordinate the controller environment and the equipment simulation environment to simulate automation system,
initiate a transfer of the control program from the automation engineering system to the controller environment,
receive ID-Data from the automation engineering system and select the at least one module behavior component from the equipment simulation database,
receive a variable list from the automation engineering system and establish a communicative coupling between the controller simulation environment and the equipment simulation environment, and
generate the simulation engineering project within the automation engineering system, the simulation engineering project comprising the simulation program.

20. The system according to claim 1, further comprising:
a communication software module communicatively coupled to the controller simulation environment and the equipment simulation environment.

21. The system according to claim 1, wherein the automation system further comprises additional technical equipment;
wherein the system for validating the control program comprises a further simulation environment for simulating the additional technical equipment;
wherein the control program is arranged and setup for also controlling the additional technical equipment when executed by the automation controller; and
wherein the further simulation environment is communicatively coupled to the controller simulation environment to one of (i) enable simulation of the automation system and (ii) simulate the automation system.

22. The system according to claim 19, wherein the simulation coordination module is configured to coordinate the controller simulation environment, the equipment simulation environment and the further simulation environment.

23. The system according to claim 20, wherein the simulation coordination module is configured to coordinate the controller simulation environment, the equipment simulation environment and the further simulation environment.

24. The system according to claim 21, wherein the simulation coordination module is configured to coordinate the controller simulation environment, the equipment simulation environment and the further simulation environment.

25. The system according to claim 1, wherein the controller simulation environment comprises the automation controller.

26. The system according to claim 1, wherein the controller simulation environment comprises simulates the automation controller.

27. The system according to claim 26, wherein the controller simulation environment is arranged as a first instance of a simulation environment program and the equipment simulation environment s arranged as a second instance of the simulation environment program.

28. A method for validating a control program for an automation system utilizing a system having a simulation runtime computer, a controller simulation environment for executing the control program on the simulation runtime computer and an equipment simulation environment for executing a simulation program on the simulation runtime computer to simulate one of (i) a behavior of an apparatus, (ii) a device and (iii) parts of the device, the control program being created in a first controller programming language and being arranged and set up to control one of (i) the apparatus and (ii) the device of the automation system when executed by an automation controller of the automation system, the method comprising:

generating the simulation program for simulating a behavior of at least one of (i) the apparatus, (ii) the device and (iii) the parts of the device, the simulation program being created in one of (i) the first controller programming language and (ii) a second controller programming language which are each executed in the same type of simulation system;

implementing the simulation program in the equipment simulation environment;

implementing the control program in the controller simulation environment;

setting up a communicative coupling between the equipment simulation environment and the controller simulation environment to enable a simulation of the automation system on the simulation runtime computer; and starting the simulation of the automation system on the simulation runtime computer;

wherein the equipment simulation environment is communicatively coupled to the controller simulation environment to at least one of (i) enable and (ii) perform a simulation of the automation system on the simulation runtime computer.

29. The method according to claim 28, further comprising:
selecting at least one module behavior component corresponding to the simulation program from an equipment simulation database storing behavior components for at least one of (i) apparatus, (ii) the device and (iii) the parts of the device before generating the simulation program.

30. The method according to claim 29, wherein said step of generating the simulation program comprises generating the simulation program based on the at least one module behavior component.

31. The method according to claim 28, wherein the control program forms part of engineering data for the automation system;
wherein the engineering data is stored in an automation engineering system; and
wherein the automation engineering system is communicatively coupled to the system for validation of the control program.

32. The method according to claim 29, wherein the control program forms part of engineering data for the automation system;
wherein the engineering data is stored in an automation engineering system; and
wherein the automation engineering system is communicatively coupled to the system for validation of the control program.

33. The method according to claim 30, wherein the control program forms part of engineering data for the automation system;
wherein the engineering data is stored in an automation engineering system; and
wherein the automation engineering system is communicatively coupled to the system for validation of the control program.

34. The method according to claim 31, wherein the engineering data further comprises ID-information regarding at least one of (i) the apparatus, (ii) the device and (iii) the parts of the device, the method further comprising:
importing the ID-information from the automation engineering system before generating the simulation program.

35. The method according to claim 31, wherein the engineering data further comprises at least one of (i) a variable list regarding input data utilized by the control program and (ii) output data generated by the control program, the method further comprising:
importing the variable list from the automation engineering system and defining a transfer of the controller input data and controller output data between the controller system and the equipment simulation system.

36. The method according to claim 34, wherein the engineering data further comprises at least one of (i) a variable list regarding input data utilized by the control program and (ii) output data generated by the control program, the method further comprising:
importing the variable list from the automation engineering system and defining a transfer of the controller input data and controller output data between the controller system and the equipment simulation system.

37. The method according to claim 31, further comprising:
generating a simulation engineering project within the automation engineering system; and
implementing the simulation program within the simulation engineering project.

38. The method according to claim 34, further comprising:
generating a simulation engineering project within the automation engineering system; and
implementing the simulation program within the simulation engineering project.

39. The method according to claim 35, further comprising:
generating a simulation engineering project within the automation engineering system; and
implementing the simulation program within the simulation engineering project.

40. The method according to claim 28, wherein the controller simulation environment simulates the automation controller.

41. The method according to claim 40, further comprising:
generating the controller simulation environment as a first instance of a simulation environment program and generating the equipment simulation environment as a second instance of the simulation environment program.

* * * * *